United States Patent [19]
Grossweiler et al.

[11] Patent Number: 5,607,717
[45] Date of Patent: Mar. 4, 1997

[54] APPLICATOR FOR SEED TREATMENT PRODUCTS

[75] Inventors: Gary Grossweiler; Timothy McArdle, both of Pekin, Ill.

[73] Assignee: Trace Chemicals Incorporated, Pekin, Ill.

[21] Appl. No.: 564,944

[22] Filed: Nov. 30, 1995

Related U.S. Application Data

[62] Division of Ser. No. 220,239, Mar. 30, 1994, Pat. No. 5,512,099.

[51] Int. Cl.⁶ .............................. A01G 5/06; B65B 39/00; A01C 1/06
[52] U.S. Cl. .............................. 427/4; 427/212; 427/346; 141/94; 141/332; 47/57.6
[58] Field of Search .............................. 427/212, 4, 346; 118/267, 303, 56, 57, 26, 27, 28, 29; 141/94, 332; 47/1.5, 57.6; 111/73, 74, 75

[56] References Cited

U.S. PATENT DOCUMENTS

| | | | |
|---|---|---|---|
| 181,136 | 8/1876 | Brandriff | 427/4 |
| 3,976,030 | 8/1976 | Ragsdale et al. | 118/303 |
| 4,503,803 | 3/1985 | Barnes | 118/303 |
| 4,586,459 | 5/1986 | Schultz | 118/303 |
| 4,895,106 | 1/1990 | Barnes | 118/684 |

*Primary Examiner*—Shrive Beck
*Assistant Examiner*—David M. Maiorana
*Attorney, Agent, or Firm*—Dorn, McEachran, Jambor & Keating

[57] ABSTRACT

An applicator for seed treatment products includes an elongated, cylindrical tube having an enlarged flange at a top end for receiving a canister of treatment products. The bottom end of the tube is inserted into a seed hopper filled with seeds, the tube penetrating beneath the surface of the seeds. A canister of treatment products is opened at one end and inserted into the flange with the open side down. The canister fits snugly in the flange so the treatment products can escape only from the bottom of the tube which is within the seed pile. The user stirs the pile with the tube to distribute the treatment products evenly throughout the pile.

3 Claims, 2 Drawing Sheets

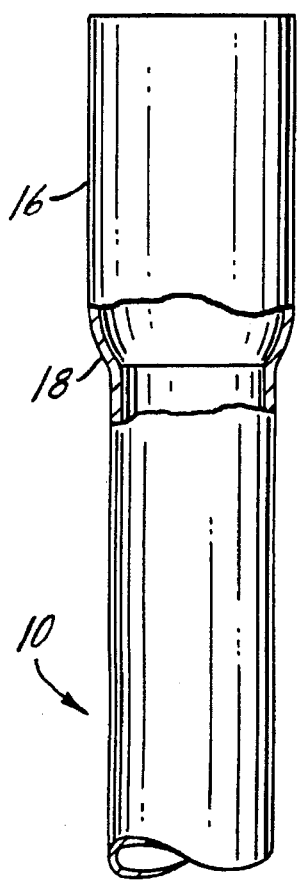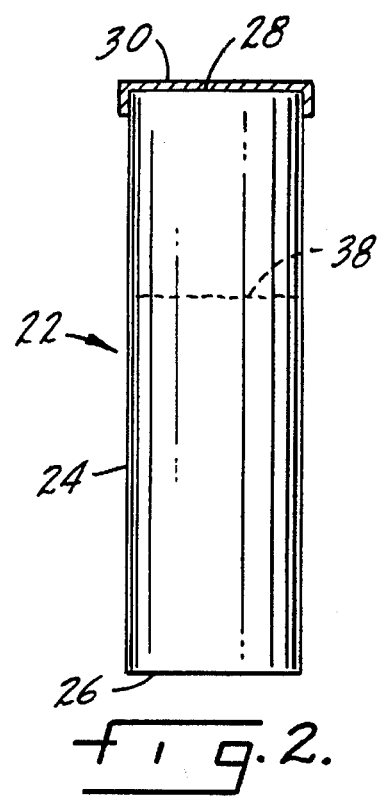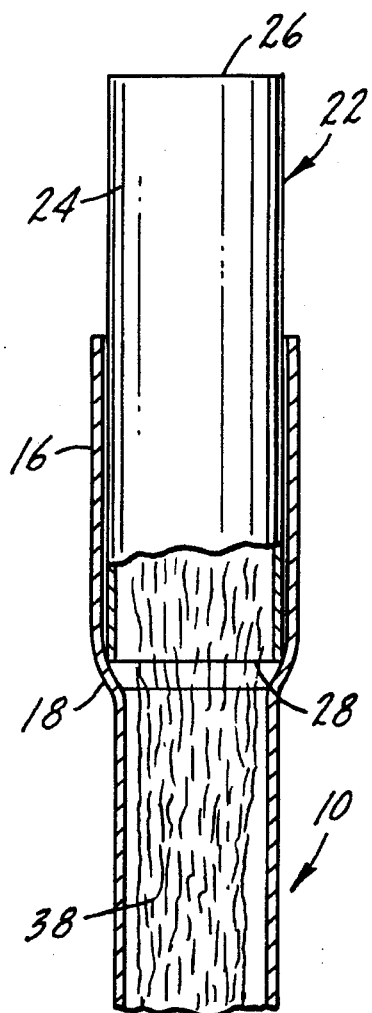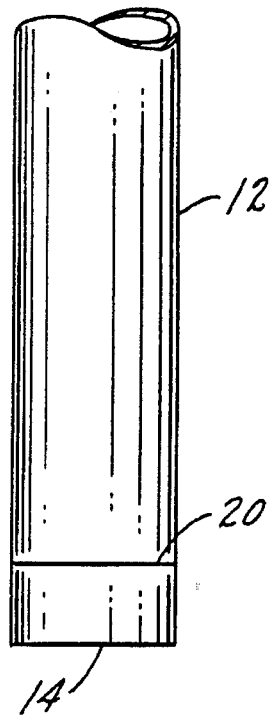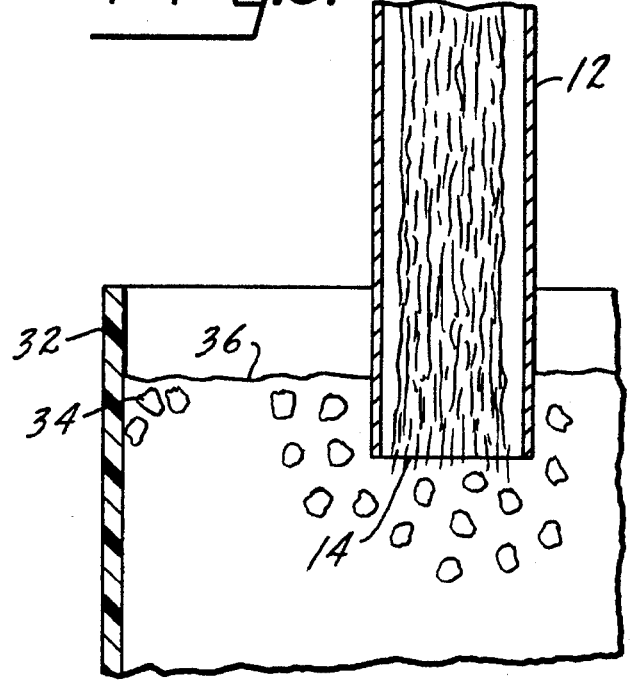

APPLICATOR FOR SEED TREATMENT PRODUCTS

This is a divisional of application Ser. No. 08/220,239 filed on Mar. 30, 1994, now U.S. Pat. No. 5,512,099.

BACKGROUND OF THE INVENTION

This invention relates to devices for applying seed protection products to agricultural seeds. It is particularly concerned with an applicator for seed treatment chemicals which minimizes user exposure to the treatment chemicals.

The value of seed treatment chemicals in protecting against seed-feeding insects and seedling disease is well known. Seed protection products of this type are available from Trace Chemicals, Inc. of Pekin, Ill. under their trademark Kernel Guard®. In the past these products have been supplied in premeasured foil packets which treat a given amount of seed. For example, 1.8 ounces of treatment product treats one bag (50 pounds) of seed corn. Seed treatment chemicals are conventionally applied to seeds in the seed box or hopper of a planting machine. The foil packets are torn open and the treatment chemicals are poured on top of the seed pile in the hopper. Any available paddle or stick is used to mix the products into the seeds. This process is repeated for the remaining hoppers of the planting machine.

The seed treatment product typically is a dry, fluent material. When the user opens the foil packet and pours the product onto the seed he is sometimes exposed to the product. This exposure is due to opening the bag and to wind blowing the product around before it can be stirred into the seed pile. The present invention eliminates this exposure as described above.

SUMMARY OF THE INVENTION

This invention is an applicator for seed treatment products. The applicator comprises an elongated, cylindrical tube having a flared portion of enlarged diameter at one end. This flared portion is referred to herein as a flange or transfer chamber. A canister initially containing the treatment chemicals has an outside diameter just slightly less than the inside diameter of the flange so the canister fits snugly into the flange. The canister has an open end normally closed by a cap or cover of some sort. The canister is longer than necessary to contain the treatment products. Accordingly, there is some empty space in the filled canister. This space allows the canister to be tipped without spilling the product.

The applicator is used by putting its smaller end into a pile of seeds, about an inch or so below the surface of the seed pile. A one-inch depth is preferred because the material will release from the tube and be at least partially visible to the user. The user then removes the cap from the canister and inverts the canister into the flange of the tube. The product will fall through the tube and be deposited below the surface of the seed. Leaving the canister in the flange, the user stirs the tube around in the pile to distribute the product. The applicator tube can be reused numerous times with new product canisters. Thus, the invention provides, in a single device, an applicator and stirring appliance.

BRIEF DESCRIPTION OF THE DRAWINGS

FIG. 1 is a side elevation view of the applicator tube.

FIG. 2 is a side elevation view of the product canister.

FIG. 3 is a section showing the applicator inserted into a seed box or hopper.

DETAILED DESCRIPTION OF THE INVENTION

Figure 4:
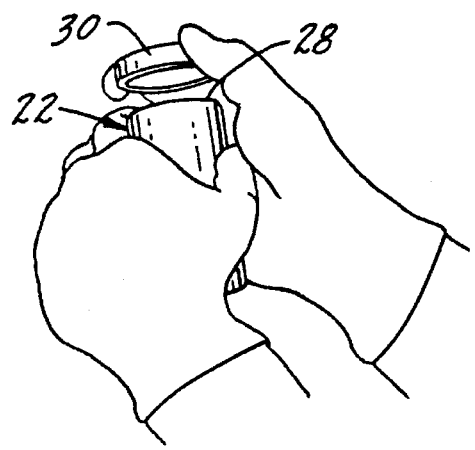
FIGS. 4, 5, 6, 7, 8, and 9 are illustrative views showing the steps for using the invention.
Figure 5:
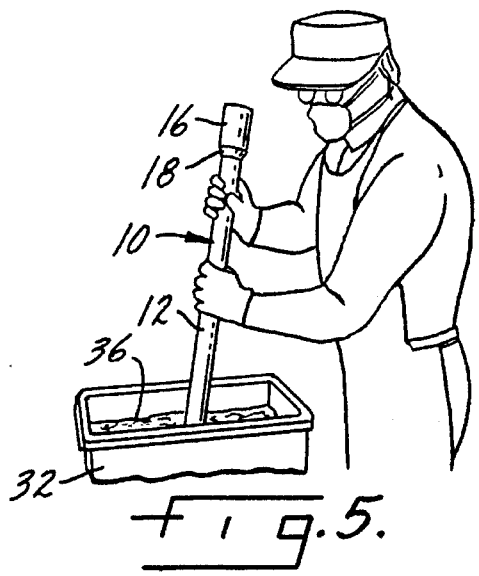
Figure 6:
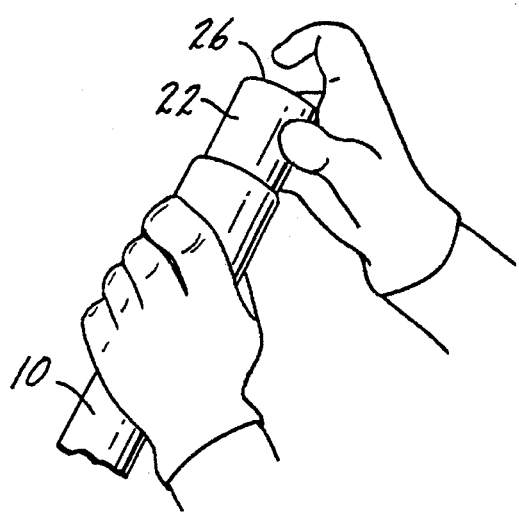

FIG. 1 illustrates the tube 10 of the applicator. The tube is an elongated cylinder made of 16-gauge aluminized or stainless steel or similar material. The tube has a hollow main body portion 12 having a lower end 14 and a flared upper end, referred to herein as a flange or transfer chamber 16. The flange has enlarged inside and outside diameters compared to the body portion 12 and is open at the top.

The intersection of the body and flange defines a transition zone comprising a tapered shoulder 18. It is preferred that the shoulder tapers gradually over a length of about 0.75" or so. Moreover, the shoulder is curved or arcuate rather than strictly frusto-conical. The surface of the shoulder accommodates variations in the canister diameter. Since the canisters will be produced on a mass production basis, manufacturing tolerances will inevitably cause variations in the diameters of the canisters. The shoulder's tapered surface will permit a tight fit of the canister against the tube regardless of the tolerance variation in the canister's diameter.

For reference purposes only, the tube 10 has an overall length of 36 inches and an outside diameter of 2 inches at the body portion 12. The flange has a length of about 4 inches, an inside diameter of 2.25 inches and an outside diameter of 2.375 inches.

A depth reference line 20 is painted or otherwise inscribed on the body portion, preferably about one inch from the lower end 14. This can be accompanied by printed instructions (not shown) telling the user to insert the tube into the seed pile up to the reference line. The one-inch depth is preferred because it allows the product to release from the tube and a portion of the product will be visible to the user. It has been found that a two-inch depth permits the product to emerge from the tube but the user cannot visually confirm that fact. Tube immersion depths of three inches or more prevent the product from releasing from the tube. That is, at tube immersion depths of three inches or more, the seeds will fill enough of the main body to prevent the treatment product from flowing out of the tube while the tube is immersed in the seed pile. The treatment product releases only when the tube is withdrawn, at which point all of the product falls on top of the pile, defeating the purpose of the invention. Accordingly, a one-inch immersion depth has been found best and the depth reference line 20 assists in assuring optimum use of the invention.

FIG. 2 shows a seed treatment product canister 22. The canister is a cylindrical container having walls 24, a closed end 26 and an open end 28. The open end of a filled canister is tightly closed by a cap 30 or other suitable cover such as a foil or shrink-wrapped membrane. The canister can be made from foil-lined fiberboard, for example. For purposes of illustration, the canister is about 7 inches long and has an outside diameter of 2.125 inches. As mentioned above, a common application rate of treatment product is 1.8 ounces of product for of 50 pounds of seed (the size of a bag normally placed in the planting machine's seed box or hopper). In the 2.125 inch diameter canister 1.8 ounces of treatment product will occupy about four or five inches of the space. Given the seven inch length of the canister, it can be seen that there will be some empty space in the filled canister. This extra space permits the opened canister to be tipped or tilted without spilling the product. Thus, treatment products will flow from the canister only when the canister is contained in the flange and the body portion is inserted in the seed pile. This aids in preventing exposure to the product.

The use, operation and function of the invention are illustrated in FIGS. 3–9. The user first empties a 50-pound bag of seed into the seed box or hopper 32 of a planting machine. The seeds form a pile 34 having a surface 36. Then the lower end 14 of the tube body is inserted into the seed pile, FIG. 3, to the one-inch depth indicated by the depth reference line 20. The tube may be tilted or angled somewhat with respect to vertical so as to reduce the angle that the canister must be turned to get it into the flange. Next the cap or cover 30 is removed from the seed treatment product canister 22, FIG. 4. The canister is carefully tipped or inverted so that its open end 28 is inserted into the flange 16 of the tube 10, FIG. 6. The canister should be inserted until it bottoms on the shoulder 18. This will make a tight seal between the canister and the tube. It may be useful to tap the closed end of the canister after it is fully inserted into the flange. The fluent seed treatment product 38 flows out of the canister, through the tube 10 and is deposited below the surface of the seed in the hopper.

Figure 7:
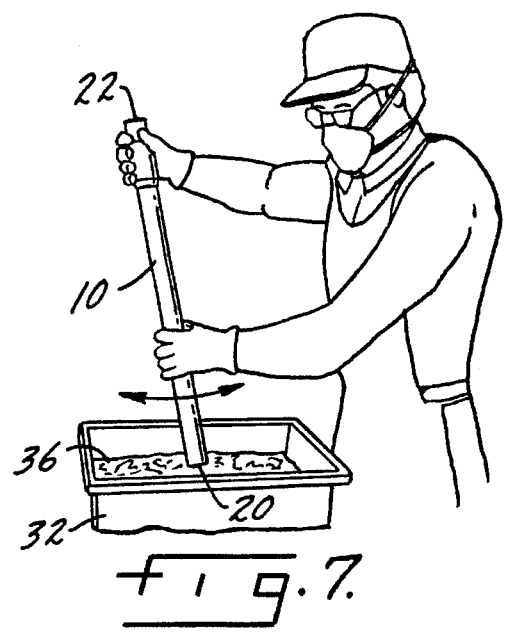
Figure 8:
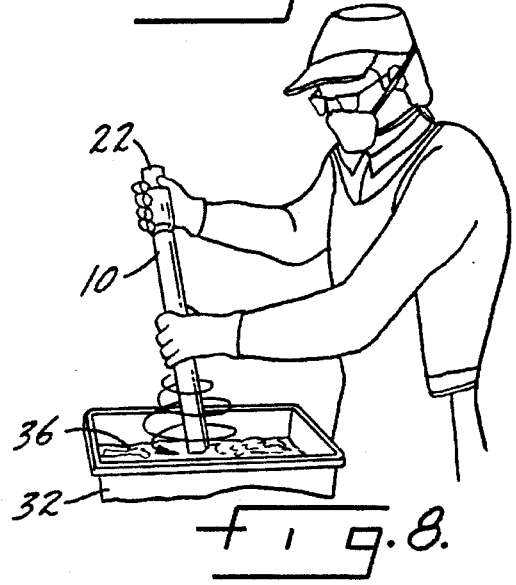
Figure 9:
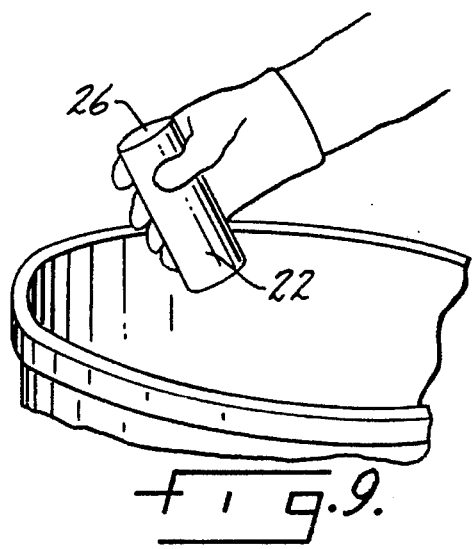

Leaving the canister in the flange to maintain a closed end, the user will then stir the seed pile at the one-inch application depth to ensure the release of the treatment product. This can be done by tilting the tube back and forth a few times at the one-inch depth, as indicated in FIG. 7. The product is typically colored to aid in visual confirmation of release from the tube. Once release is verified, the user mixes the product with deep and wide strokes of the tube to distribute the product onto all the seeds in the hopper, FIG. 8. The empty canister is removed, FIG. 9, and the tube can then be transferred to the next hopper where the process is repeated.

The applicator eliminates exposure in several ways. By dispensing the product beneath the surface of the seed pile, the product is never exposed to wind. Also, by using a rigid canister which empties through the tube, product exposure from the opening and pouring process is reduced. That is, since the product is never poured into open air, the chances of it blowing around are reduced. The oversized canister further minimizes exposure during insertion into the flange. The tube also provides a custom mixing tool for distributing the product onto all the seeds in the hopper.

While a preferred form of the invention has been shown and described, it will be realized that alterations and modifications may be made thereto without departing from the scope of the following claims. For example, while it is preferred that the tube is round (i.e., it has a circular cross-section) to minimize the chances of product becoming stuck to the tube, it could be square or of other cross-sectional shape.

We claim:

1. A method of applying seed treatment products to seeds in a pile while minimizing user exposure to the products, comprising the steps of:

inserting one end of an elongated tube beneath the surface of the pile with the other end of the tube extending above the pile;

opening a seed treatment product canister to expose an open end of the canister;

inserting said opened canister into said other end of the tube such that the seed treatment products flow from the open end of the canister into and through the tube; and stirring the seed pile with the tube to distribute the seed treatment product throughout the pile.

2. The method of claim 1 wherein the inserting step is characterized by inserting the tube to a depth of about one-inch.

3. The method of claim 1 wherein the stirring step is characterized by first tilting the tube back and forth at a depth of about one inch to release the products from the tube and then by mixing the seed pile throughout the depth of the pile.

\* \* \* \* \*